March 31, 1925.  1,531,499

H. M. PFLAGER

SIX-WHEEL TRUCK

Filed March 19, 1924

Inventor
Harry M. Pflager
By Cornwall, Bedell & Janus
ATTYS.

Patented Mar. 31, 1925.

1,531,499

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

SIX-WHEEL TRUCK.

Application filed March 19, 1924. Serial No. 700,324.

*To all whom it may concern:*

Be it known that I, HARRY M. PFLAGER. a citizen of the United States, residing at St. Louis, Missouri, have invented a certain new and useful Improvement in Six-Wheel Trucks, of which the following is a specification, such as will enable others skilled in the art to which it appertains to make and use the same.

My invention relates to railway rolling stock and consists in an improved six wheel truck construction.

My invention is applicable to that type of trucks in which the truck frame includes transoms, cross bolsters adjacent the transoms, and a center bolster carried by the cross bolsters.

It has been customary to lower the center bolster upon the cross bolster and secure the assembled bolsters together. It has been proposed heretofore to make the center bolsters and cross bolsters in one piece thereby eliminating the expense and other disadvantages of an assembled structure, but it is difficult and sometimes impossible to assemble a bolster construction of this type with the truck frame.

The object of my invention is to provide a center and cross bolster structure which may be applied to the truck frame as a unit and similarly removed therefrom.

More specifically, my invention consists in the provision of a center bolster having a center plate portion with members carrying the center plate portion and extending longitudinally of the truck under a nearby transom and then united with cross bolsters extending transversely of the truck in the usual manner.

In the accompanying drawings which illustrate a selected embodiment of my invention—

Figure 1:
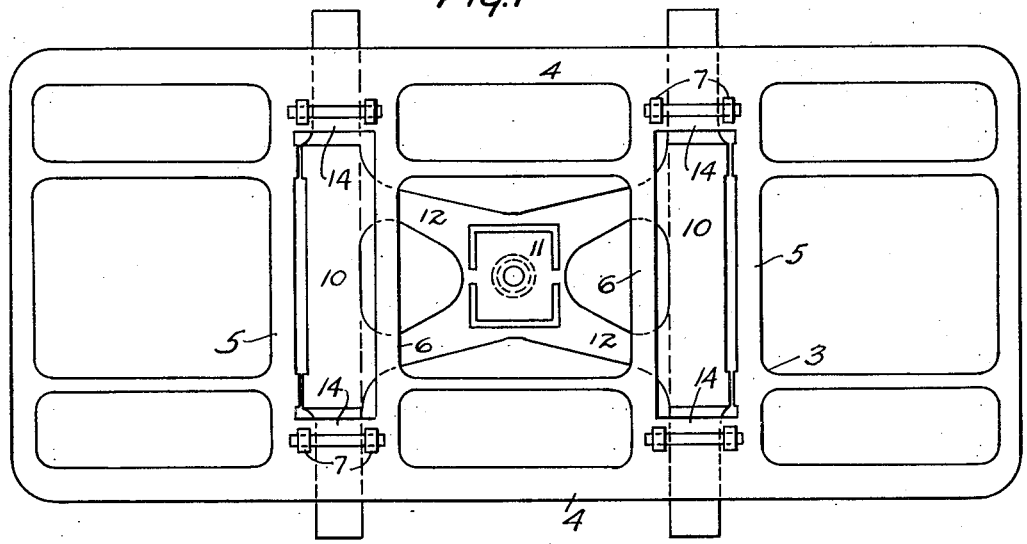
Figure 1 is a top view of a truck to which my invention is applied.
Figure 2:
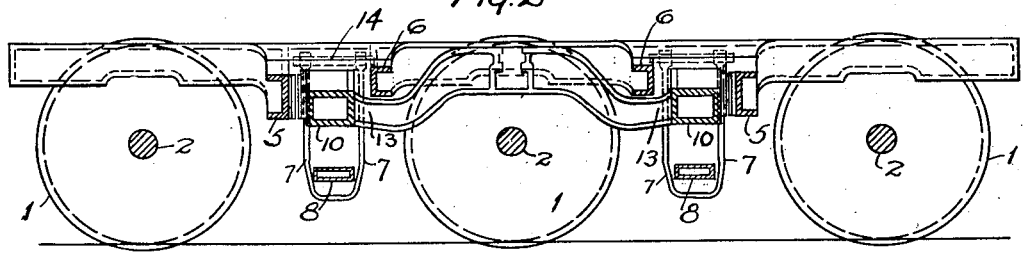
Figure 2 is a longitudinal vertical section through the truck, some of the parts thereof being removed for clearer illustration.
Figure 3:
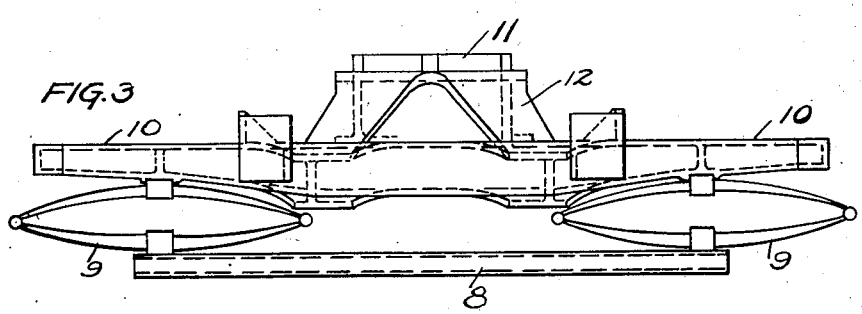
Figure 3 is an end elevation of my improved bolster structure.

The truck includes the usual wheels 1, axles 2, which will carry the usual journal boxes, equalizers, and springs, not shown, all of which support the truck frame 3 including wheel pieces 4 and transoms connecting the wheel pieces. These transoms are here illustrated as including outer transoms 5 and inner transoms 6. The inner transoms are somewhat higher than the outer transoms and more shallow for reasons hereinafter referred to. It will be noted, however, that the top surfaces of the inner and outer transoms are below the top surfaces of the wheel pieces.

Swingingly suspended from transoms 5 and 6 are the usual links 7 and spring planks 8 carrying the truck bolster springs 9 upon which rest the ends of cross bolsters 10. Carried by cross bolsters 10 is the center bolster comprising a center plate portion 11, center plate carrying legs 12 extending downwardly from portion 11 longitudinally of the truck and under inner transoms 6, hence upwardly at 13 to where they connect with cross bolsters 10.

With this construction it is possible to apply the bolster structure to the truck frame by moving it upwardly from beneath the frame and completing the truck assembly. This method of assembling the truck is advantageous because of the truck frame construction illustrated in which the frame elements 14, forming part of the base for the spring plank links, span the space between the inner and outer transoms and prevent the lowering of the cross bolsters into position. With a center bolster extending over the inner transoms in the usual manner it is necessary to make the cross bolsters separate elements and bolt or otherwise secure the center bolster thereto.

While I have shown the center bolster and cross bolsters as being formed of a one-piece casting, it will be understood that this preferred construction is not essential to the embodiment of my invention as the bolster parts may be made separately and secured together before assembly with the truck frame if such method of manufacture is preferable. In either case, however, the feature of this invention which permits the application and removal of the bolster structure from beneath the frame is present and I contemplate all such modifications as fall within the scope of the following claims.

I claim:

1. In a car truck, a frame, cross bolsters carried by said frame, transoms located between said bolsters and the center of the truck, and a center bolster extending under said transoms and supported by said cross bolsters.

2. In a car truck, a frame including transoms and a spring supported center bolster extending beyond said transoms longitudinally of the truck and adapted to be moved upwardly into position in said truck.

3. In a car truck, a frame including transoms and a center bolster located between said transoms and provided with legs extending under said transoms, and spring supporting means for said bolster.

4. In a car truck, a frame including transoms and a center bolster member located between said transoms, said member including a center bearing portion above the level of the tops of said transoms and spring supported center bearing carrying portions extending under said transoms.

5. In a car truck, a frame including transoms, cross bolsters adjacent said transoms, elements integral with said frame and extending over said cross bolsters, and a center bolster formed integrally with said cross bolsters and removable therewith from said frame.

6. In a car truck, a frame including outer and inner transoms, cross bolsters positioned between adjacent outer and inner transoms, and a center bolster carried by said cross bolsters positioned between said inner transoms and extending beneath the latter.

7. In a car truck, a frame, cross bolsters and a center bolster, frame members extending over portions of both said cross bolsters and center bolster, said cross bolsters and center bolster being removable as a unit from said frame.

8. In a car truck, a frame, cross bolsters and a center bolster, frame members extending over portions of said center bolster, said cross bolsters and center bolster being removable as a unit from said frame.

9. In a six wheel truck, a middle axle, a truck frame including an inner and an outer transom on each side of said axle, and a center bolster overlying said axle and underlying said inner transoms, and bolster supporting springs located between said inner and outer transoms.

10. In a car truck, a frame including integral transoms, and an integral casting comprising a center bolster and cross bolsters, portions of which extend under said transoms.

11. In a car truck, a frame including wheel pieces and transoms connecting the same, and a bolster comprising a center bearing portion and center bearing carrying portions extending beneath said transoms and wheel pieces.

12. A one-piece car truck bolster comprising a center bearing portion, center bearing carrying portions extending downwardly, longitudinally and upwardly, and supporting portions at the ends of said upwardly extending carrying portions and extending transversely thereof.

13. In a car truck, a frame including transoms and a casting comprising integrally formed center bolster and cross bolsters, portions of which extend under said transoms.

14. In a car truck, a frame including wheel pieces and transoms connecting the same, and a bolster comprising a center bearing portion and integrally formed center bearing carrying portions which extend beneath said transoms and wheel pieces.

In testimony whereof I hereunto affix my signature this 15 day of March, 1924.

H. M. PFLAGER.